(12) United States Patent
Locke

(10) Patent No.: US 6,336,428 B1
(45) Date of Patent: Jan. 8, 2002

(54) VACUUM PET BRUSH

(76) Inventor: Laura H. Locke, 2314 Somersworth Dr., Columbus, OH (US) 43219

( * ) Notice: Subject to any disclaimer, the term of this patent is extended or adjusted under 35 U.S.C. 154(b) by 0 days.

(21) Appl. No.: 09/602,240

(22) Filed: Jun. 23, 2000

(51) Int. Cl.[7] .................. A01K 13/00; A36B 13/04; A45D 24/22
(52) U.S. Cl. .................. 119/625; 119/611; 119/612; 119/615; 119/618; 15/22.1; 132/120; 132/126
(58) Field of Search .................. 119/625, 606, 119/609, 611, 612, 615, 618, 626; 15/344, 345, 347, 398, 402, 105, 22.1, 300.1; 132/120, 126

(56) References Cited

U.S. PATENT DOCUMENTS

| | | | |
|---|---|---|---|
| 1,878,345 A | | 9/1932 | Suter |
| 1,878,858 A | * | 9/1932 | Kitto |
| 3,574,885 A | * | 4/1971 | Jones .................. 15/393 |
| D244,712 S | | 6/1977 | Houston |
| 4,185,355 A | | 1/1980 | Williams |
| 4,279,095 A | * | 7/1981 | Aasen .................. 43/139 |
| 4,485,583 A | * | 12/1984 | Planty .................. 43/139 |
| 4,799,460 A | | 1/1989 | Kuhl |
| 5,074,006 A | | 12/1991 | Eremita |
| 5,095,853 A | | 3/1992 | Kruger |
| 5,115,765 A | | 5/1992 | El Omary |
| 5,211,131 A | * | 5/1993 | Plyler .................. 119/606 |
| 5,435,327 A | * | 7/1995 | Ho .................. 132/118 |
| 5,462,018 A | * | 10/1995 | Louison .................. 119/626 |
| 5,655,481 A | * | 8/1997 | Trahan .................. 119/606 |
| D389,222 S | * | 1/1998 | Stewart .................. D22/123 |
| 5,768,748 A | * | 6/1998 | Silvera et al. .................. 15/402 |
| 6,086,682 A | * | 7/2000 | Anderson .................. 134/6 |

* cited by examiner

Primary Examiner—Yvonne Abbott

(57) ABSTRACT

A vacuum pet brush for collecting debris loosened by a grooming brush or comb. The vacuum pet brush includes a main housing that has an open end and closed end. The closed end of the main housing has a plurality of venting apertures. The main housing has enclosed inside a vacuum bag, a fan connected to a motor, and a battery operationally connected to the motor. In addition, a grooming head member that has a debris collection conduit is selectively coupled to the open end of the main housing.

8 Claims, 2 Drawing Sheets

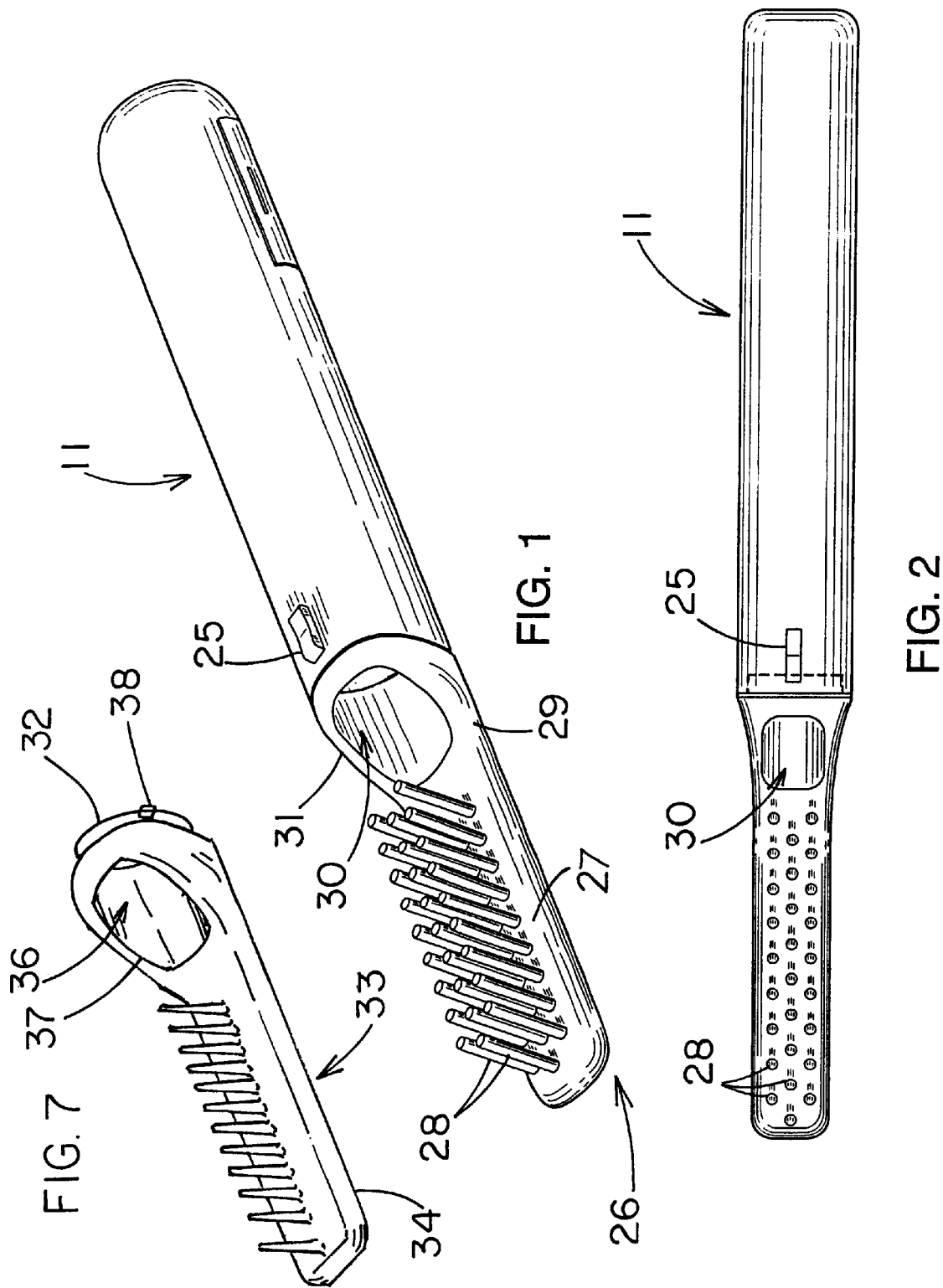

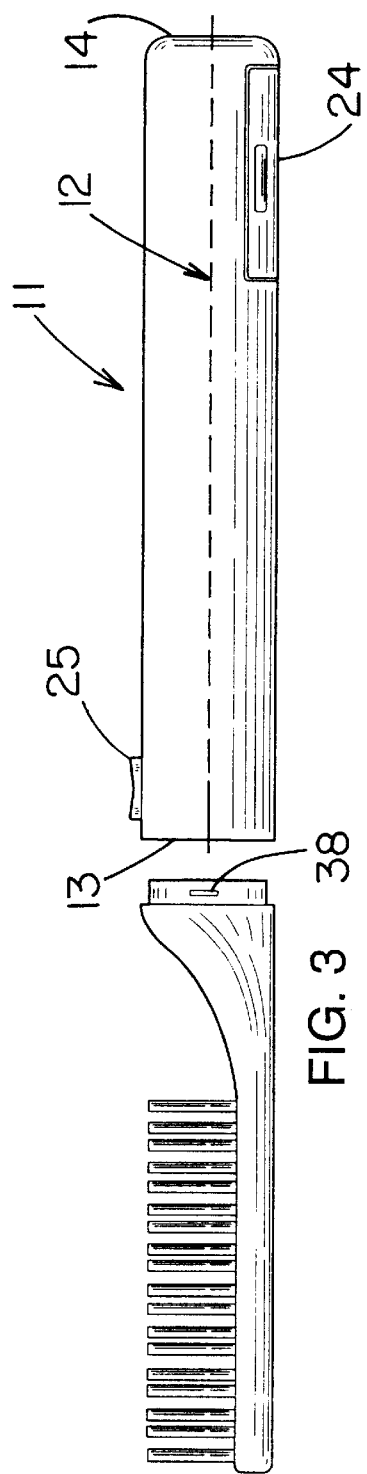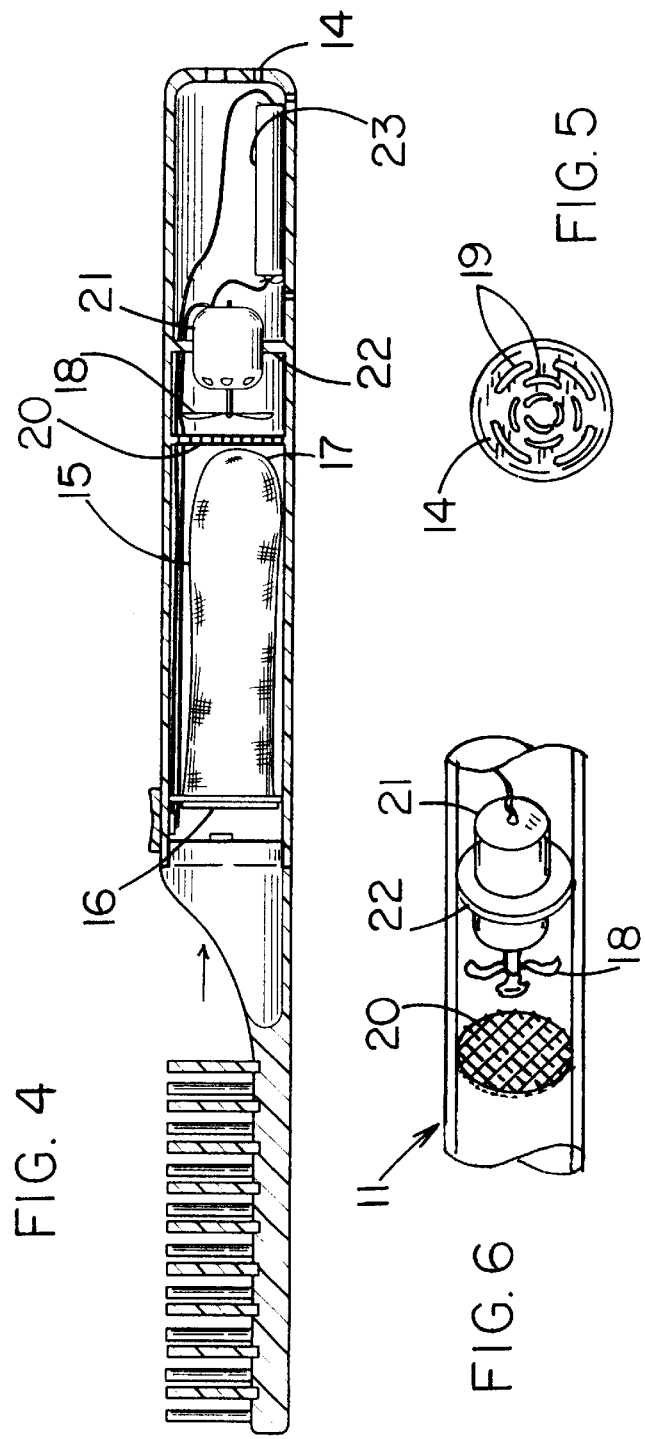

VACUUM PET BRUSH

BACKGROUND OF THE INVENTION

1. Field of the Invention

The present invention relates to pet grooming devices and more particularly pertains to a new vacuum pet brush for collecting debris loosened by a grooming brush or comb.

2. Description of the Prior Art

The use of pet grooming devices is known in the prior art. More specifically, pet grooming devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,799,460; 5,074,006; 5,115,765; U.S. Pat. No. Des. 244,712; U.S. Pat. Nos. 5,095,853; 1,878,345 and 4,185,355.

While these devices fulfill their respective, particular objectives and requirements, the aforementioned patents do not disclose a new vacuum pet brush. The inventive device includes a generally tubular main housing that has an open end and closed end. The closed end of the main housing has a plurality of venting apertures. The main housing has enclosed inside an elongated vacuum bag, a fan connected to a motor and a battery operationally connected to the motor. In addition, a grooming head member that has a debris collection conduit is selectively coupled to the open end of the main housing.

In these respects, the vacuum pet brush according to the present invention substantially departs from the conventional concepts and designs of the prior art, and in so doing provides an apparatus primarily developed for the purpose of collecting debris loosened by a grooming brush or comb.

SUMMARY OF THE INVENTION

In view of the foregoing disadvantages inherent in the known types of pet grooming devices now present in the prior art, the present invention provides a new vacuum pet brush construction wherein the same can be utilized for collecting debris loosened by a grooming brush or comb.

The general purpose of the present invention, which will be described subsequently in greater detail, is to provide a new vacuum pet brush apparatus and method which has many of the advantages of the pet grooming devices mentioned heretofore and many novel features that result in a new vacuum pet brush which is not anticipated, rendered obvious, suggested, or even implied by any of the prior art pet grooming devices, either alone or in any combination thereof.

To attain this, the present invention generally comprises a generally tubular main housing that has an open end and closed end. The closed end of the main housing has a plurality of venting apertures. The main housing has enclosed inside an elongated vacuum bag, a fan connected to a motor and a battery operationally connected to the motor. In addition, a grooming head member that has a debris collection conduit is selectively coupled to the open end of the main housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vacuum pet brush apparatus and method which has many of the advantages of the pet grooming devices mentioned heretofore and many novel features that result in a new vacuum pet brush which is not anticipated, rendered obvious, suggested, or even implied by any of the prior art pet grooming devices, either alone or in any combination thereof.

It is another object of the present invention to provide a new vacuum pet brush that may be easily and efficiently manufactured and marketed.

It is a further object of the present invention to provide a new vacuum pet brush that is of a durable and reliable construction.

An even further object of the present invention is to provide a new vacuum pet brush which is susceptible of a low cost of manufacture with regard to both materials and labor, and which accordingly is then susceptible of low prices of sale to the consuming public, thereby making such vacuum pet brush economically available to the buying public.

Still yet another object of the present invention is to provide a new vacuum pet brush which provides in the apparatuses and methods of the prior art some of the advantages thereof, while simultaneously overcoming some of the disadvantages normally associated therewith.

Still another object of the present invention is to provide a new vacuum pet brush for collecting debris loosened by a grooming brush or comb.

Yet another object of the present invention is to provide a new vacuum pet brush which includes a generally tubular main housing that has an open end and closed end. The closed end of the main housing has a plurality of venting apertures. The main housing has enclosed inside an elongated vacuum bag, a fan connected to a motor and a battery operationally connected to the motor. In addition, a grooming head member that has a debris collection conduit is selectively coupled to the open end of the main housing.

Still yet another object of the present invention is to provide a new vacuum pet brush that is easy to use.

Even still another object of the present invention is to provide a new vacuum pet brush that is easy to clean.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new vacuum pet brush according to the present invention.

FIG. 2 is a schematic top view of the present invention.

FIG. 3 is a schematic side view of the present invention, illustrating how the brush head member is coupled to the main housing.

FIG. 4 is a schematic cross-sectional view of the present invention, illustrating the internal components.

FIG. 5 is a schematic end view of the main housing of the present invention, illustrating the venting apertures.

FIG. 6 is a schematic cut-out perspective view of the screen member of the present invention.

FIG. 7 is a schematic perspective view of the comb head member of the present invention.

DESCRIPTION OF THE PREFERRED EMBODIMENT

With reference now to the drawings, and in particular to FIGS. 1 through 7 thereof, a new vacuum pet brush embodying the principles and concepts of the present invention and generally designated by the reference numeral 10 will be described.

As best illustrated in FIGS. 1 through 7, the vacuum pet brush 10 generally comprises a generally tubular main housing 11 that has a longitudinal axis 12, an open first end 13, and a closed second end 14.

The vacuum pet brush also has an elongated vacuum bag 15 that has an open end 16 and a closed end 17. The vacuum bag 15 is removably coupled within the main housing 11. The open end 16 of the vacuum bag 15 is concentrically positioned proximate the open first end 13 of the main housing 11. This design ensures that debris entering the open first end 13 of the main housing 11 passes into the vacuum bag 15. The vacuum bag 15 has a longitudinal axis aligned with the longitudinal axis 12 of the main housing 11.

A fan 18 for drawing air through the open end 13 of the main housing 11 is positioned within the main housing 11. The fan facilitates the collection of debris in the vacuum bag 15. The fan is positioned proximate the closed end 17 of the vacuum bag 15. A central axis of the fan 18 is aligned with the longitudinal axis 12 of the main housing 11.

The main housing 11 has a plurality of venting apertures 19 in the closed second end 14 for permitting the venting of air drawn into the main housing. In addition, a screen member 20 is positioned in an interior of the main housing 11. The screen member 20 is positioned between the closed end 17 of the vacuum bag 15 and the fan 18. The screen member 20 prevents the vacuum bag 15 from contacting the fan 18.

A motor 21 is coupled to the main housing 11 by a plurality of motor mounting members 22 that extend inward from the main housing 11. The motor 21 is operationally coupled to the fan 18 for selectively rotating the fan upon activation of the motor 21. The motor 21 has a longitudinal axis aligned with the longitudinal axis 12 of the main housing 11.

A battery 23 is positioned within the main housing 11 for providing power to the motor. The main housing includes a battery compartment door 24 that is positioned proximate the battery 23 for facilitating replacement of the battery 23. The battery compartment door 24 is positioned proximate the closed second end 14 of the main housing 11.

A switch 25 is operationally coupled between the motor 21 and the battery 23. The switch 25 is for selectively activating the motor 21 when the switch 25 is in a closed position. The switch 25 is further for selectively deactivating the motor 21 when the switch 25 is in an open position. The switch 25 is positioned proximate the open first end 13 of the main housing 11.

A brush head member 26 is selectively engageable to the main housing 11. The brush head member 26 has a brush head portion 27 that has a plurality of bristles 28 that extend from the brush head portion 27. The brush head member 26 further has a brush neck portion 29 that extends from the brush head portion 27. The brush neck portion 29 has a brush debris collection conduit 30. The brush debris collection conduit 30 has an outer end 31 that faces the bristles 28. The brush debris collection conduit 30 also has an interior end 32 that is alignable with the open first end 13 of the main housing 11. Activation of the fan 18 draws air through the brush debris collection conduit 30 for facilitating of collection of debris loosened by the bristles 28.

The brush head member 26 is selectively couplable to the main housing 11. A lock catch 38 on the brush head member 26 secures the brush head member 26 to the main housing 11 when the brush head member 26 is coupled to the main housing 11. The lock catch 38 is positioned proximate the interior end 32 of the brush debris collection conduit 30 and is engagable with the main housing 11 when the brush head member 26 is inserted into the main housing 11. When the brush head member 26 is properly coupled to the main housing 11, the switch 25 is substantially aligned with a central line of bristles 28 of the brush head member 26.

In addition, a comb head member 33 may be selectively engaged to the main housing 11. The comb head member 33 has a comb head portion 34 that has a plurality of aligned teeth 35 that extend from the comb head portion 34. The comb head member 33 further has a comb neck portion 35 that extends from the comb head portion 34. The comb neck portion 35 has a comb debris collection conduit 36. The comb debris collection conduit 36 has an outer end 37 that faces the teeth 35. The a comb debris collection conduit 36 also has an interior end 37 that is alignable with the open first end 13 of the main housing 11. Activation of the fan 18 draws air through the comb debris collection conduit 36 for facilitating collection of debris loosened by the teeth 35.

The comb head member 33 is selectively couplable to the main housing 11. A lock catch 38 on the comb head member 33 secures the comb head member 33 to the main housing 11 when the comb head member 26 is coupled to the main housing 11. The lock catch 38 is positioned proximate the interior end 37 of the comb debris collection conduit 36 and is engagable with the main housing 11 when the comb head member 33 is inserted into the main housing 11. When the comb head member 33 is properly coupled to the main housing 11, the switch 25 is substantially aligned with the line of teeth 35 of the comb head member 33.

In use, the brush head member 26 or the comb head member 26 is coupled to the main body 11. The switch 25 on the main body 11 is placed in its closed position thereby turning the fan 18 on. The pet brush assembly 10 may then be used to groom a pet. Any loose hair that comes from the result of the grooming is sucked into the brush debris collection conduit 30 or the comb debris collection conduit 36 and collected in the vacuum bag 15. When finished the brush head member 26 or the comb head member 26 is removed from the main body 11. The vacuum bag 15 can then be removed from the open end 13 of the main body 11 and emptied.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet brush assembly comprising:
   a main housing having a longitudinal axis, an open first end, and a closed second end;
   a vacuum bag having an open end and a closed end, said vacuum bag being removably coupled within said main housing such that said open end is positioned proximate said open first end whereby debris entering said open first end of said main housing passes into said vacuum bag;
   a fan, said fan being for drawing air through said open end of said main housing for facilitating collection of debris in said vacuum bag;
   said main housing having a plurality of venting apertures in said closed second end for permitting venting of said air drawn into said main housing;
   a motor coupled to said main housing, said motor being operationally coupled to said fan for selectively rotating said fan upon activation of said motor;
   a battery positioned within said main housing for providing power to said motor;
   a switch operationally coupled between said motor and said battery, said switch being for selectively activating said motor when said switch is in a closed position, said switch further being for selectively deactivating said motor when said switch is in an open position;
   a grooming head member having a collection conduit, said collection conduit being attachable to said open first end of said main housing whereby activation of said fan draws air through said grooming head member for facilitating collection of debris loosened by said grooming head member; and
   a screen member being positioned in an interior of said main housing, said screen member being positioned between said closed end of said vacuum bag and said fan for preventing said vacuum bag for contacting said fan.

2. A pet brush assembly of claim 1, further comprising:
   said head grooming member being a brush head member selectively engageable to said main housing, said brush head member having a brush head portion having a plurality of bristles extending from said brush head portion; and
   said brush head member further having a brush neck portion extending from said brush head portion, said debris collection conduit having an outer end facing said bristles and an interior end alignable with said open first end of said main housing whereby activation of said fan draws air through said debris collection conduit for facilitating of collection of debris loosened by said bristles.

3. A pet brush assembly of claim 2, further comprising:
   said switch being positioned proximate said open first end of said main housing; and
   said brush head member being selectively couplable to said main housing such that said switch is substantially aligned with a central line of bristles of said brush head member when said brush head member is coupled to said main housing.

4. A pet brush assembly of claim 1, further comprising:
   said head grooming member being a comb head member selectively engageable to said main housing, said comb head member having a comb head portion having a plurality of aligned teeth extending from said comb head portion; and
   said comb head member further having a comb neck portion extending from said comb head portion, said debris collection conduit having an outer end facing said teeth and an interior end alignable with said open first end of said main housing whereby activation of said fan draws air through said debris collection conduit for facilitating collection of debris loosened by said teeth.

5. A pet brush assembly of claim 4, further comprising:
   said switch being positioned proximate said open first end of said main housing; and
   said comb head member being selectively couplable to said main housing such that said switch is substantially aligned with said line of teeth when said comb head member is coupled to said main housing.

6. A pet brush assembly of claim 1, further comprising:
   said main housing including a battery compartment door positioned proximate said battery for facilitating replacement of said battery, said battery compartment door being positioned proximate said closed second end of said main housing.

7. A pet brush assembly of claim 1, further comprising:
   said switch being positioned proximate said open first end of said main housing.

8. A pet brush assembly comprising:
   a generally tubular main housing having a longitudinal axis, an open first end, and a closed second end;

an elongated vacuum bag having an open end and a closed end, said vacuum bag being removably coupled within said main housing such that said open end is concentrically positioned proximate said open first end whereby debris entering said open first end of said main housing passes into said vacuum bag, said vacuum bag having a longitudinal axis aligned with said longitudinal axis of said main housing;

a fan for drawing air through said open end of said main housing for facilitating collection of debris in said vacuum bag, said fan being positioned proximate said closed end of said vacuum bag, a central axis of said fan being aligned with said longitudinal axis of said main housing;

said main housing having a plurality of venting apertures in said closed second end for permitting venting of said air drawn into said main housing;

a screen member being positioned in an interior of said main housing, said screen member being positioned between said closed end of said vacuum bag and said fan for preventing said vacuum bag for contacting said fan;

a motor coupled to said main housing by a plurality of motor mounting members extending inwardly from said main housing, said motor being operationally coupled to said fan for selectively rotating said fan upon activation of said motor, said motor having a longitudinal axis aligned with said longitudinal axis of said main housing;

a battery positioned within said main housing for providing power to said motor;

said main housing including a battery compartment door positioned proximate said battery for facilitating replacement of said battery, said battery compartment door being positioned proximate said closed second end of said main housing;

a switch operationally coupled between said motor and said battery, said switch being for selectively activating said motor when said switch is in a closed position, said switch further being for selectively deactivating said motor when said switch is in an open position, said switch being positioned proximate said open first end of said main housing;

a brush head member selectively engageable to said main housing, said brush head member having a brush head portion having a plurality of bristles extending from said brush head portion, said brush head member further having a brush neck portion extending from said brush head portion, said brush neck portion having a brush debris collection conduit having an outer end facing said bristles and an interior end alignable with said open first end of said main housing whereby activation of said fan draws air through said brush debris collection conduit for facilitating of collection of debris loosened by said bristles;

a comb head member selectively engageable to said main housing, said comb head member having a comb head portion having a plurality of aligned teeth extending from said comb head portion, said comb head member further having a comb neck portion extending from said comb head portion, said comb neck portion having a comb debris collection conduit having an outer end facing said teeth and an interior end alignable with said open first end of said main housing whereby activation of said fan draws air through said comb debris collection conduit for facilitating collection of debris loosened by said teeth;

said brush head member being selectively couplable to said main housing such that said switch is substantially aligned with a central line of bristles of said brush head member when said brush head member is coupled to said main housing; and said comb head member being selectively couplable to said main housing such that said switch is substantially aligned with said line of teeth when said comb head member is coupled to said main housing.

\* \* \* \* \*